(12) United States Patent
Wilke et al.

(10) Patent No.: US 11,463,238 B2
(45) Date of Patent: *Oct. 4, 2022

(54) BIDIRECTIONALLY LINKED BLOCKCHAIN STRUCTURE

(71) Applicant: Bundesdruckerei GMBH, Berlin (DE)

(72) Inventors: Andreas Wilke, Berlin (DE); Manfred Paeschke, Wandlitz (DE); Ilya Komarov, Berlin (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 282 days.

This patent is subject to a terminal disclaimer.

(21) Appl. No.: 16/617,096

(22) PCT Filed: Apr. 6, 2018

(86) PCT No.: PCT/EP2018/058928
§ 371 (c)(1),
(2) Date: Nov. 26, 2019

(87) PCT Pub. No.: WO2018/219533
PCT Pub. Date: Dec. 6, 2018

(65) Prior Publication Data
US 2020/0259634 A1      Aug. 13, 2020

(30) Foreign Application Priority Data

Jun. 2, 2017   (DE) .......................... 102017209381.1

(51) Int. Cl.
*H04L 9/06* (2006.01)
*G06F 17/11* (2006.01)
(Continued)

(52) U.S. Cl.
CPC ............ *H04L 9/0643* (2013.01); *G06F 17/11* (2013.01); *G06F 21/64* (2013.01); *H03M 13/091* (2013.01); *H04L 9/3236* (2013.01); *H04L 9/50* (2022.05)

(58) Field of Classification Search
CPC . H04L 9/0643; H04L 9/3236; H04L 2209/38; H04L 9/50; G06F 17/11; G06F 21/64; H03M 13/091
See application file for complete search history.

(56) References Cited

U.S. PATENT DOCUMENTS 9,608,829 B2 *   3/2017   Spanos ................. H04L 9/3242
9,979,718 B2 *   5/2018   Kurian .................... G06F 3/064
(Continued)

FOREIGN PATENT DOCUMENTS

WO   WO-2016/161073 A1   10/2016

OTHER PUBLICATIONS

International Search Report PCT/ISA/210 for International Application No. PCT/EP2018/058928 dated May 28, 2018.
(Continued)

*Primary Examiner* — Ali S Abyaneh
(74) *Attorney, Agent, or Firm* — Harness, Dickey & Pierce, P.L.C.

(57) ABSTRACT

In one embodiment the method includes providing a bidirectionally linked blockchain structure; generating an additional block for expanding the blockchain structure, which includes the data to be stored and is intended to be linked bidirectionally to the last block of the blockchain structure, the last block of the blockchain structure including stored data; and calculating a first block-dependent linking function for bidirectionally linking the last block to the additional block. The calculation of the linking function including calculating a combined block-dependent check value of the
(Continued)

last block and of the additional block, using the data stored in the last block and the data to be stored in the additional block; and associating the combined check value with a block-independent, linking process-specific function. The method further includes adding the first block-dependent linking function to the last block and to the additional block.

22 Claims, 8 Drawing Sheets

(51) Int. Cl.
    *G06F 21/64* (2013.01)
    *H03M 13/09* (2006.01)
    *H04L 9/32* (2006.01)
    *H04L 9/00* (2022.01)

(56) References Cited

U.S. PATENT DOCUMENTS

| | | | |
|---|---|---|---|
| 10,192,073 B2* | 1/2019 | Marin | G06F 21/31 |
| 10,805,067 B1 | 10/2020 | Griffin et al. | |
| 2016/0028552 A1 | 1/2016 | Spanos et al. | |
| 2016/0261690 A1 | 9/2016 | Ford | |
| 2017/0070890 A1 | 3/2017 | Luff et al. | |
| 2017/0116136 A1 | 4/2017 | Macnicol et al. | |
| 2017/0346639 A1 | 11/2017 | Muftic | |
| 2017/0352219 A1 | 12/2017 | Spanos et al. | |
| 2017/0366353 A1 | 12/2017 | Struttmann | |
| 2018/0219669 A1 | 8/2018 | Chen et al. | |
| 2018/0367518 A1 | 12/2018 | Singh et al. | |
| 2019/0073646 A1 | 3/2019 | Wright et al. | |
| 2019/0103975 A1 | 4/2019 | Jacobs et al. | |
| 2019/0122186 A1 | 4/2019 | Kano et al. | |
| 2020/0057869 A1* | 2/2020 | Wilke | H04L 9/3236 |
| 2020/0118068 A1* | 4/2020 | Turetsky | G06Q 20/06 |
| 2020/0235913 A1* | 7/2020 | Wilke | H04L 9/0643 |
| 2020/0259634 A1* | 8/2020 | Wilke | H03M 13/091 |
| 2020/0287707 A1* | 9/2020 | Wilke | G06F 16/9024 |
| 2020/0344043 A1* | 10/2020 | Komarov | H04L 9/0637 |
| 2021/0352134 A1* | 11/2021 | Bjontegard | H04L 67/10 |

OTHER PUBLICATIONS

Written Opinion of the International Searching Authority PCT/ISA/237 for International Application No. PCT/EP2018/058928 dated May 28, 2018.
International Preliminary Report on Patentability dated Dec. 12, 2019, issued in corresponding PCT Application No. PCT/EP2018/058928.
Juan Garay et al., "The Bitcoin Backbone Protocol: Analysis and Applications", International Association for Cryptologic Research,,Band 20160127:132350, Jan. 27, 2016 (Jan. 27, 2016), Seite 1-37.
A. Narayanan et al., 'Bitcoin and Cryptocurrency Technologies' Sections 1.2, 2.4, 3.4, and 3.5, retrieved on the internet at https://web.archive.org/web/20170602075829/https://d28rh4a8wq0iu5.cloudfront.net/bitcointech/readings/princeton_bitcoin_book.pdf, Feb. 2016.
Y. Sompolinsky et al., 'SPECTRE: Serialization of Proof-of-work Events: Confirming Transactions via Recursive Elections' retrieved on the internet at https://web.archive.org/web/2017071015 2154/https://eprint.iacr.org/2016/1159, Jul. 2017.
"Mastering Bitcoin", Chapter 7, The Blockchain, p. 161.
Written Opinion of the International Searching Authority PCT/ISA/237 for International Application No. PCT/EP2018/054557 dated Apr. 6, 2018.
Office Action dated Mar. 30, 2022 for U.S. Appl. No. 16/754,490.
Notice of Allowance dated Apr. 5, 2022 for U.S. Appl. No. 16/648,479.
Office Action dated Jul. 14, 2021 for U.S. Appl. No. 16/498,134.
Notice of Allowance dated Feb. 2, 2022 for U.S. Appl. No. 16/498,134.
"Block Chain", viewed Mar. 27, 2020, https://en.wikipedia.org/wiki/Block chain.
"Mastering Bitcoin", Chapter 7, The Blockchain, 2015, p. 161.
Nakamoto, "Bitcoin: Peer-to-Peer Electronic Cash System", 2008, (https://bitcoin.org/bitcoin.pdf}, p. 1-9.
International Search Report PCT/ISA/210 for International Application No. PCT/EP2018/075507 dated Jan. 11, 2019.
Written Opinion of the International Searching Authority PCT/ISA/237 for International Application No. PCT/EP2018/075507 dated Jan. 11, 2019.
A. Narayanan et al., 'Bitcoin and Cryptocurrency Technologies' Sections 1.2, 2.4, 3.4, and 3.5, retrieved on the internet at https://web.archive.org/web/2017060207 5829/https://d28rh4a8wqOiu5.cloudfront.net /bitcointech/readings/princeton_bitcoin_book.pdf, Feb. 2016.
Y. Sompolinsky et al., 'SPECTRE: Serialization of Proof-of-work Events: Confirming Transactions via Recursive Elections' retrieved on the internet at https://web.archive.org/web/2017071015 2154/https://eprint.iacr.orq/2016/1159, Jul. 2017.
International Preliminary Reporton Patentability for Application No. PCT/EP2018/075507 dated Apr. 30, 2020.
International Search Report PCT/ISA/210 for International Application No. PCT/EP2018/054557 dated Apr. 6, 2018.
Written Opinion of the International Searching Authority PCT/ISA/237 for International Application No. PCT/EP2018/054557 filed Feb. 23, 2018.
International Preliminary Reporton Patentability for PCT Application No. PCT/EP2018/054557 dated Oct. 10, 2019.

* cited by examiner

BIDIRECTIONALLY LINKED BLOCKCHAIN STRUCTURE

CROSS-REFERENCE TO RELATED APPLICATIONS

This application is a national phase under 35 U.S.C. § 371 of PCT International Application No. PCT/EP2018/058928, which has an International filing date of Apr. 6, 2018, which claims priority to German Application No. 102017209381.1, filed Jun. 2, 2017, the entire contents of each of which are hereby incorporated by reference.

The invention relates to a method and to an electronic data storage system for storing data. In particular, the invention relates to a method and to an electronic data storage system for storing data in a tamper-proof manner in a bidirectionally linked blockchain structure.

The possibility of modifying or even deliberately tampering with digitally encoded data in electronic storage devices presents a technical challenge.

Blockchain structures are known from the prior art for securing data. These blockchain structures are unidirectionally linked blockchain structures. For example, corresponding blockchain structures are used to log transactions of cryptocurrencies, such as the Bitcoin payment system.

A blockchain structure provides an expandable list of data sets, which are arranged in blocks. In the prior art, the integrity of the individual blocks is protected by unidirectional linking, using cryptographic check values of the individual blocks in the form of hash values. A linking of the block is achieved in that each block includes a cryptographic check value of the preceding block, including the cryptographic check value stored in the preceding block. Each block includes a check value, which is based on the content of all the preceding blocks. As a result, it is difficult to subsequently manipulate such a blockchain since this would require manipulating not just a single block, but all subsequent blocks, as the check value of each subsequent block is based, among other things, on the block to be manipulated. If the block to be manipulated is in fact manipulated, the check value thereof changes. This changed check value no longer matches the check values of the subsequent blocks, making the manipulation recognizable and obvious during a check by way of the check values.

Known blockchain structures, however, only implement unidirectional linking and data security, since only data contents of preceding blocks are taken into consideration in each case during linking. It is thus possible to check based on the link whether a preceding block of a presented blockchain structure was tampered with. However, it is not possible to check whether the presented blockchain structure is complete. In particular, it is not possible to check whether potentially a portion of the blockchain structure was cut off. Moreover, it is not possible to check whether the last block was tampered with.

Furthermore, common hash methods are used when checking and securing the blockchain structure. Individual blocks of the blockchain structure are unidirectionally linked to one another by hash values. To be able to check such a blockchain structure, having blocks that are unidirectionally linked to one another, for manipulation, not only all the information of the individual blocks, but also the respective hash value thereof is required. Checking such a blockchain structure moreover makes it necessary to start with the first block of the corresponding blockchain structure, and to end with the last block.

It is the object of the invention to create an improved method for storing data in a tamper-proof manner.

The object underlying the invention is achieved by the features of the independent claims. Embodiments of the invention are described in the dependent claims.

Embodiments encompass a method for storing data in a tamper-proof manner in an electronic storage device, using a blockchain structure linked with bidirectional functions. The method comprises:

providing a bidirectionally linked blockchain structure;
providing the data to be stored;
generating an additional block for expanding the blockchain structure, which includes the data to be stored and is intended to be linked bidirectionally to the last block of the blockchain structure, the last block of the blockchain structure including stored data;
calculating a first block-dependent linking function for bidirectionally linking the last block to the additional block, the calculation of the linking function comprising:
calculating a combined block-dependent check value of the last block and of the additional block, using the data stored in the last block and the data to be stored in the additional block;
associating the combined check value with a block-independent, linking process-specific function;
adding the first block-dependent linking function to the last block;
adding the first block-dependent linking function to the additional block; and
storing the blockchain structure expanded by the additional block.

Embodiments may have the advantage that they allow a bidirectionally linked blockchain to be provided, having blocks that are linked to one another by means of block-dependent bidirectional linking functions. The connection allows the blockchain structure to be checked bidirectionally for authenticity or manipulation in the process. The blockchain structure may not only be checked in one direction, but in two directions in the process.

A blockchain structure shall be understood to mean a data structure forming a blockchain. A "blockchain" shall be understood to mean an ordered data structure comprising a plurality of mutually linked data blocks. In particular, a blockchain shall be understood to mean a database, the integrity of which, that is, security against subsequent manipulation, is ensured by storing a check value, such as a hash value, of the preceding data set in the respective following data set. The check value is assigned to the content of the preceding data set and unambiguously characterizes the same. If the content of the preceding data set is altered, it no longer meets the check feature, whereby the alteration becomes evident. In the case of known blockchain structures, for example, each block of the blockchain is unambiguously identified by a hash value and references a previous block in the blockchain, the hash value of which the block includes.

For examples of a blockchain, see https://en.wikipedia.org/wiki/Block_chain_(database) and "Mastering Bitcoin," Chapter 7, The Blockchain, page 161 ff. The blockchain concept was described in 2008, for example, in a whitepaper under the pseudonym Satoshi Nakamoto in the context of the Bitcoin cryptocurrency ("Bitcoin: Peer-to-Peer Electronic Cash System" (https://bitcoin.org/bitcoin.pdf)). In this exemplary embodiment, each block of the blockchain, in the header thereof, includes the hash of the entire prior block header. In this way, the sequence of blocks is clearly established, creating a chain structure. As a result of the concatenation of the individual blocks thus implemented, it is achieved that a subsequent alteration of prior blocks is not possible, without likewise altering all subsequent blocks.

The security of the blockchain may be increased, for example, by publishing it or making it publicly accessible, thereby allowing a comparison between an available copy of the blockchain to other published or accessible copies of the same blockchain.

A check value for data is a value that is assigned to the corresponding data and unambiguously characterizes the data in such a way that the integrity of the data may be checked based on the stored check value. A check value in the form of a checksum, for example, provides a value that was calculated from the original data and is configured to recognize at least one bit error in the data. As a function of the complexity of the calculation rule for the checksum, it is possible to recognize, or also correct, more than one error. Known check values or checksums may be based, for example, on adding up data values, calculating a digit sum, a parity bit, a weighted average of the data, or on more complex calculation methods, such as a cyclic redundancy check or the use of a hash function.

A combined block-dependent check value is a check value that depends both on the data of a first block and on the data of a second block. According to embodiments, this may be a check value that is calculated using an association of the data to be considered. According to further embodiments, this may be a check value that is calculated as an association of a plurality of check values, for example an association of a first check value of the data of a first block with a second check value of the data of a second block. For example, such an association may be an arithmetic operation, such as addition, subtraction, multiplication and/or division.

In the case of a unidirectionally linked blockchain structure, a check value is calculated using a block of the blockchain structure, and is added to an additional block to be linked unidirectionally to this block. Based on the check value of the added block, it is possible to check the integrity of the block or of the data of the corresponding block to which the added block is unidirectionally linked. For this purpose, the check value is recalculated, for example, using the data of the corresponding block and is compared to the check value provided by the added block. If the two check values agree, the integrity of the block, or of the data of the corresponding block, to which the added block is unidirectionally linked has been preserved.

In the case of the bidirectionally linked blockchain structure according to embodiments, a check value is not only calculated using data of the last block of the blockchain structure, but also using data of the additional block to be bidirectionally linked to this block. Based on such a combined check value of the added block, it is possible to check the integrity of the block, or of the data of the corresponding block, to which the added block is bidirectionally linked, as a function of the data of the added block. For this purpose, the block-dependent linking function comprising the check value is recalculated, for example, using the data of the corresponding block and the data of the added block, and is compared to the block-dependent linking function provided by the added block. If the two linking functions agree, the integrity of the block, or of the data of the corresponding block, to which the added block is bidirectionally linked, as well as the integrity of the additional block, or of the data of the additional block, is preserved.

If a bidirectional linking function is added both to the additional block and to the block to which the additional block is bidirectionally linked, an integrity check may also be carried out based on the bidirectional linking function added to the corresponding block of the blockchain structure. In other words, when bidirectionally linking two blocks, an integrity check may be carried out both proceeding from the bidirectional linking function stored in a first of the two blocks, and proceeding from the bidirectional linking function stored in the second of the two blocks.

Based on the combined check value, which is included in the calculation of the block-dependent bidirectional linking function, of the last block to which the added block is bidirectionally linked, it is also possible, in contrast to known unidirectionally linked blockchain structures, to recognize whether the blockchain structure was cut off. Since, in the case of known unidirectionally linked blockchain structures, the respective check values only include information about preceding blocks, it is not possible to recognize based on such a check value whether subsequent blocks exist. As a result, it is also not possible to recognize when subsequent blocks are altered, replaced or removed as part of tampering. In contrast, according to embodiments, the respective combined check values of the bidirectional linking functions include information about the two blocks that are concatenated. Furthermore, the linking function is added to each of the two corresponding blocks. If an added block is altered, replaced or removed as part of tampering, this may be recognized based on the linking function of the block to which the added block is bidirectionally linked.

According to embodiments, each of the inner blocks of the blockchain structure, that is, all the blocks except for the first and last blocks, includes at least two block-dependent linking functions since the inner blocks are each linked to a preceding block and a subsequent block by different linking functions. In contrast to known, exclusively hash value-based linking methods for blockchain structures, no individual values are added to the blocks in the present case, but functions that are dependent on at least one variable, which are not established for the concatenation. If a block comprises multiple block-dependent linking functions, these may be associated with one another. From the spectrum of the mutually associated linking functions of the individual connections thus results a shared linking function, which comprises the information of all contributing linking functions of the individual connections. For example, a corresponding association may be an arithmetic operation, such as addition, subtraction, multiplication and/or division.

According to embodiments, the data considered in the calculation of the check values comprises a proper subset of the data of the corresponding blocks. According to further embodiments, the data considered in the calculation of the check value comprises all the data of the corresponding blocks. According to embodiments, the data of the last block of the blockchain structure considered for the calculation of the combined block-dependent check value comprises the block-dependent linking function of the last block to a penultimate block of the blockchain structure. According to embodiments, the data of the last block considered in the calculation of the combined block-dependent check value does not comprise the linking function of the last block to the penultimate block.

According to embodiments, the last block of the blockchain structure furthermore comprises a second block-dependent linking function of bidirectionally concatenation the last block to a penultimate block of the blockchain structure, the addition of the first block-dependent linking function to the last block comprising associating the first block-dependent linking function with the second block-dependent linking function.

According to embodiments, each of the inner blocks of the blockchain structure, that is, all the blocks except for the first and last blocks, includes at least two block-dependent linking functions since the inner blocks are each linked to a preceding block and a subsequent block by different linking functions. In contrast to known, exclusively hash value-based linking methods for blockchain structures, no individual values are added to the blocks in the present case, but functions that are dependent on at least one variable, which are not established for the concatenation. If a block comprises multiple block-dependent linking functions, these may be associated with one another. From the spectrum of the mutually associated linking functions of the individual connections thus results a shared linking function, which comprises the information of all contributing linking functions of the individual connections. For example, a corresponding association may be an arithmetic operation, such as addition, subtraction, multiplication and/or division.

According to embodiments, the block-independent, linking process-specific function is a function of a family of functions, which comprises a plurality of block-independent, linking process-specific functions, wherein an ordinal number is assigned to each function of the family of functions, and the functions of the family of functions, starting with a first ordinal number assigned to a first bidirectional concatenation of the bidirectionally linked blockchain structure between a first block and a second block of the chain structure, according to a predefined assignment rule are intended to be individually assigned, in ascending order, to a bidirectional concatenation of two blocks of the bidirectionally linked blockchain structure and to be used to calculate a linking function dependent on the corresponding two blocks.

Embodiments may furthermore have the advantage that a secure linking process may be implemented, as a result of more complex and secure linking functions, by associating the combined check value with a block-independent, linking process-specific function. A block-independent, linking process-specific function here is understood to mean a mathematical function having at least one variable. The function is linking process-specific in that a different function is used for each linking process, that is, for each bidirectional connection between two blocks of the blockchain structure. According to embodiments, all linking process-specific functions comprise the same variables. According to embodiments, the linking process-specific functions are derived from a shared comprehensive function or functional, so that the resulting linking process-specific functions form a family of functions. According to embodiments, the functions of the family of functions are assigned to the connections of the blockchain structure according to a predefined assignment rule. According to embodiments, the functions of the family of functions are ordered according to the sequence of the connections of the blockchain structure. Based on this order, the linking process-specific function that is applied to a particular linking process may be clearly established. According to embodiments, the bidirectional concatenation between the blocks of the blockchain structure is thus not only dependent on the data contents of the two blocks to be linked to one another, but also on the ranking order of the corresponding connection between the blocks within the blockchain structure, that is, on the positions of the blocks within the blockchain structure.

According to embodiments, the block-independent, linking process-specific function comprises a polynomial of the M-th order, wherein M is a natural number, which forms the ordinal number assigned to the function.

According to embodiments, the block-independent, linking process-specific function comprises an association of the polynomial of the M-th order with an exponential function, wherein the exponent of the exponential function comprises a polynomial of the order greater than or equal to two. A corresponding association may be a multiplication, for example.

Embodiments may have the advantage that the ordinal number of the block-independent, linking process-specific function may be established using the order of the polynomial. This provides a clear assignment of the linking functions to the individual linking processes during the formation of the blockchain structure. For example, the order of the polynomial may be identical to the ordinal number. In this way, a polynomial of the first order, or a linking function comprising a polynomial of the first order, would be assigned to the first connection of the blockchain structure having the ordinal number 1. According to further embodiments, the ordinal number may be established as the order of the polynomial minus a predefined number. If, for example, this is the number 10, a polynomial of the eleventh order, or a linking function comprising a polynomial of the eleventh order, would be assigned to the first connection of the blockchain structure having the ordinal number 1. According to embodiments, the assignment rule furthermore establishes with respect to the individual connections of the blockchain structure what the value of the coefficients of the polynomials is. A corresponding rule may be established by the shared comprehensive function.

According to embodiments, an increment operator and a decrement operator, which are able to increase or decrease arbitrary linking process-specific functions by one order or by multiple orders, are provided for the shared comprehensive function that is used to form the block-dependent linking functions, or more precisely, the block-independent, linking process-specific functions. Applying such an increment operator or such a decrement operator to a block-independent, linking process-specific function thus results in a block-independent, linking process-specific function of a higher or lower order, wherein the shared comprehensive function encompasses both this starting function and the ending function.

The use of polynomial-based block-independent, linking process-specific functions may furthermore have the advantage that the corresponding polynomials may be transformed into one another. Using a derivation operation, a polynomial of the M-th order may be transformed into a polynomial of the (M−1)-th order. Furthermore, a polynomial of the M-th order may be transformed into a polynomial of the (M+1)-th order by multiplication with the appropriate variable, such as x. According to embodiments, the transformation functions comprise a combination of the corresponding variable, that is, a polynomial of the first order, such as x, and a derivation operator, such as $$\frac{d}{dx}.$$

Hereafter, transformation functions that transform a function of the M-th order, such as a polynomial of the M-th order, into a function of the (M+1)-th order are referred to as increment operators, and transformation functions that transform a function of the M-th order, such as a polynomial of the M-th order, into a function of the (M−1)-th order are referred to as decrement operators.

According to embodiments, the increment operators and decrement operators may transform a polynomial of the M-th order into a polynomial of the (M+P)-th order or of the (M−P)-th order, wherein P denotes a natural number greater than or equal to two. According to embodiments, the transformation functions in this case comprise a combination of a P-th power of the corresponding variable, that is, a polynomial of the first order, such as $x^P$, and of a derivation operator of the order P, such as $$\frac{d^P}{dx^P}.$$

According to embodiments, the calculation of the combined block-dependent check value of the last block and of the additional block comprises applying a hash function to the data stored in the last block and the data to be stored in the additional block. Embodiments may have the advantage that the use of a hash value for forming the combined check value provides a simple and secure method for assigning an unambiguous check value to the data of the blocks to be linked to one another.

According to embodiments, the data in the blocks of the blockchain structure is stored in each case in a square (T×T) matrix structure, wherein T is a natural number greater than or equal to two. The calculation of the combined block-dependent check value of the last block and of the additional block furthermore comprises:

- calculating a sum across each column of a first matrix structure, which is provided by the two matrix structures of the data stored in the last block and of the data to be stored in the additional block;
- calculating a sum across each row of a second matrix structure, which is provided by the two matrix structures of the data stored in the last block and of the data to be stored in the additional block;
- calculating the combined sum from the sum of the i-th column and the sum of the i-th row, i being a natural number and running from 1 to T; and
- forming the combined block-dependent check value by associating the combined sums with one another.

Embodiments may have the advantage that, as a result of different summation rules for the two blocks to be linked to one another, for example, a summation across the individual columns on the one hand, and a summation across the individual rows on the other hand, the resulting combined check value comprises not only information about the data of the blocks to be linked to one another, but also information about the sequence thereof. If the sequence of the two blocks is reversed, the summation for the formerly preceding block, for example, does not take place by columns, but by rows, whereas a column-wise instead of a row-wise summation takes place for the formerly following, but now preceding block.

According to embodiments, the blocks to be linked to one another may also include matrix structures having different sizes. For example, the data of one block is stored in a (V×W) matrix structure, while the data of the other block is stored in an (X×Y) matrix structure, wherein V, W, X, Y are natural numbers greater than or equal to two. In this case, it is possible to determine, for the formation of the combined check value, which of the numbers V, W, X or Y is the greatest, the number of rows V or X, or the number of columns W or Y. If the number of rows and columns is identical, no additional method steps are required. If the number of the columns and/or rows is different for the two matrix structures, each of the matrix structures is expanded by such a number of rows and/or columns that all column and row numbers are identical to the previously determined greatest number. An established placeholder value, such as the value 0, is assigned to all added matrix elements in the process. Ultimately, two square matrix structures having an identical size are thus obtained, to which the aforementioned method for square (T×T) matrix structures may be applied.

According to embodiments, the association of the combined sums with one another comprises stringing together the combined sums. Embodiments may have the advantage that they provide a simple and unambiguous method for forming the combined check value.

According to embodiments, consecutive blocks of the bidirectionally linked blockchain structure are each bidirectionally linked to one another, wherein two blocks bidirectionally linked to one another in each case comprise a shared block-dependent linking function, wherein the shared block-dependent linking function in each case comprises a combined block-dependent check value of the data stored in the two consecutive blocks.

According to embodiments, the blockchain structure is replaced by a shortened blockchain structure, wherein the shortened blockchain structure is shortened by at least one inner chain segment of the blockchain structure, wherein the inner chain segment comprises at least one block.

Embodiments may have the advantage that disk space may be saved, for example, as a result of shortening the blockchain structure. Moreover, it is possible to ascertain, based on the linking functions between which the inner chain segment was removed, how many blocks the corresponding segment comprises. If, for example, L blocks are removed, applying the increment operator L times to the linking process-specific linking function of the last block of the blockchain structure in front of the removed blocks must result in the linking process-specific function of the first block of the blockchain structure after the removed blocks. The same applies, analogously, to applying the decrement operator L times to the linking process-specific function of the first block after the removed blocks.

Embodiments may furthermore have the advantage that shorting the blockchain structure allows, for example, blocks containing sensitive data, in terms of security, to be removed so as to protect the data from unauthorized access. The use of the linking process-specific functions makes it possible to establish how many blocks were removed. Furthermore, the use of the combined block-dependent check value makes it possible later to check removed blocks for the authenticity or integrity thereof. If removed blocks are provided later or in addition, it is possible to check based on the linking functions whether these are in fact the removed blocks. Furthermore, it may be established, during a provision of only the removed blocks, based on the linking process-specific functions from which area of a blockchain structure the blocks were removed. Furthermore, if the shared comprehensive function from which the linking process-specific functions are derived is selected in a blockchain-specific manner, it may be established based on the linking functions which blockchain structure the removed blocks belong to. The shared comprehensive function thus represents a kind of fingerprint of the corresponding blockchain structure, which is independent of the data stored in the blockchain structure. Such options may, in particular, be advantageous if the data stored in the blocks of the blockchain structure is encrypted.

If an inner chain segment is removed, a respective subsequent or preceding block, which due to the bidirectional concatenation comprises the same block-dependent linking function, is missing, as a result of the removal, for the two blocks of the blockchain structure between which the corresponding inner chain segment is removed. According to embodiments, the two blocks of the shortened blockchain structure, between which the inner chain segment was removed, are concatenated using a combined bidirectional linking function, which comprises a combination of all block-dependent linking functions of the blocks of the removed inner chain segment.

Embodiments may have the advantage that the blockchain structure may be shortened, without the block-dependent information regarding the concatenations of the removed blocks being lost. The combination of the block-dependent linking functions of the blocks of the inner linking segment may, for example, be associations, such as arithmetic operations. Such arithmetic associations may comprise addition, subtraction, multiplication and/or division, for example. The block-dependent linking functions are each dependent on data contents of the blocks which they link, or data contents unambiguously assigned to these blocks. The combined bidirectional linking function, which links the two blocks remaining after the removal of the inner chain segment to one another without direct concatenation, thus comprises information regarding all data contents of all blocks of the inner chain segment removed between the corresponding blocks, as a combination of all block-dependent linking functions of the blocks of the inner chain segment.

According to embodiments, the method furthermore comprises:
providing block-independent transformation functions, which are configured to transform the block-independent, linking process-specific functions of the block-dependent linking functions into one another; and
checking the shortened blockchain structure for consistency, the block-independent, linking process-specific functions of the block-dependent linking functions of two directly neighboring blocks of the shortened blockchain structure between which the inner chain segment was removed being transformed into one another, using the transformation functions, and the transformation results being checked for consistency.

Embodiments may have the advantage that the option is created to remove critical information, in terms of security, from the blockchain structure, while the remaining shortened blockchain structure remains checkable.

According to embodiments, the block-independent transformation functions are configured, as increment operators, to transform each of the block-independent, linking process-specific functions of the block-dependent linking functions into the next higher block-independent, linking process-specific function according to the ascending order and/or, as decrement operators, to transform each of the block-independent, linking process-specific functions of the block-dependent linking functions into a next lower block-independent, linking process-specific function according to the ascending order.

Embodiments may have the advantage that an efficient checking method is provided, using the increment and decrement operators.

According to embodiments, the block-dependent linking function $k_M(x)$ has the following form:

$$k_M(x) = g(D_N, D_{N+1}) f_M(x)$$

where $g(D_N, D_{N+1})$ denotes the combined block-dependent check value of the N-th and (N+1)-th blocks of the blockchain structure, DN denotes the data stored in the N-th block, and $D_{N+1}$ denotes the data to be stored in the (N+1)-th block, wherein the block-independent, linking process-specific function $f_M(x)$ has the following form:

$$f_M(x) = c H_M(\sqrt{b}\, x) e^{-\frac{1}{2} b x^2},$$

where M denotes a natural number, which is unambiguously assigned to the individual linking process, where b and c are each an established parameter, and x denotes a variable, and wherein $H_M(\sqrt{b} x)$ denotes a Hermite polynomial having the following form:

$$H_M(\sqrt{b}\, x) = (-1)^M e^{bx^2} \frac{d^M}{d(\sqrt{b}\, x)^M} (e^{-bx^2}).$$

Embodiments may have the advantage that an efficient checking method may be provided as a result of the use of a block-dependent linking function, which comprises Hermite polynomials.

According to embodiments, the transformation functions comprise an increment operator having the form:

$$\hat{a}^\dagger = \sqrt{\frac{b}{2}} \left( x - b^{-1} \frac{d}{dx} \right)$$

and a decrement operator having the form:

$$\hat{a} = \sqrt{\frac{b}{2}} \left( x + b^{-1} \frac{d}{dx} \right).$$

Furthermore, consistency exists between the N-th and the (N+L)-th blocks between which an inner chain segment including the blocks N+1 through N+L−1 was removed, if $$\frac{(\hat{a}^\dagger)^{L-1} k_M(x)}{k_{M+L-1}(x)} = \frac{c\, k_M(x)}{(\hat{a})^{L-1} k_{M+L-1}(x)}$$

applies, where c is a constant.

According to embodiments, the block-independent, linking process-specific function $f_M(x)$ is, for example:

$$f_M(x) = \left(\frac{b}{\pi}\right)^{\frac{1}{4}} \frac{1}{\sqrt{2^M M!}} H_M(\sqrt{b}\, x) e^{-\frac{1}{2} b x^2}.$$

Here, $\hat{a}^\dagger f_M(x) = \sqrt{M+1}\, f_{M+1}(x)$ and $\hat{a} f_M(x) = \sqrt{M}\, f_{M-1}(x)$ apply.

If, for example, the two blocks N+1 and N+2 are removed between the block N and the block N+3, the remaining block N still comprises the block-dependent bidirectional linking function $k_M(x) = g(D_N, D_{N+1}) f_M(x)$ of the bidirectional connection between the block N and the block N+1. The remaining block N+3 still comprises the block-dependent bidirectional linking function $k_{M+2}(x)=g(D_{N+2}, D_{N+3})f_{M+2}(x)$.

If the combined check values are independent of x, the commutation rules apply:

$$\hat{a}^\dagger\, g(D_N, D_{N+1}) = g(D_N, D_{N+1})\hat{a}^\dagger,$$

$$\hat{a}\, g(D_N, D_{N+1}) = g(D_N, D_{N+1})\hat{a}.$$

Depending on the embodiment, the combined check value $g(D_N, D_{N+1})$ may be given as an association of two check values of the corresponding data, that is, $g(D_N, D_{N+1})=g(D_N)°g(D_{N+1})$, or as a check value of an association of the corresponding data itself, that is, $g(D_N, D_{N+1})=g(D_N°D_{N+1})$. For applying the increment operator to $k_M(x)$ twice, the following applies:

$$(\hat{a}^\dagger)^2 k_M(x) = g(D_N, D_{N+1})(\hat{a}^\dagger)^2 f_M(x) = g(D_N, D_{N+1})\sqrt{M+1}\sqrt{M+2}f_{M+2}(x)$$

For applying the decrement operator to $k_{M+2}(x)$ twice, the following applies:

$$(\hat{a})^2 k_{M+2}(x) = g(D_{N+2}, D_{N+3})(\hat{a})^2 f_{M+2}(x) = g(D_{N+2}, D_{N+3})\sqrt{M+2}\sqrt{M+1}f_M(x).$$

As a result, $$\frac{k_{M+2}(x)}{(\hat{a}^\dagger)^2 k_M(x)} = \frac{g(D_{N+2}, D_{N+3})}{g(D_N, D_{N+1})\sqrt{M+1}\sqrt{M+2}} = \frac{d_{M+2}}{\sqrt{M+1}\sqrt{M+2}},$$

applies, where $d_{M+2}=g(D_{N+2}, D_{N+3})/g(D_N, D_{N+1})$ and $$\frac{k_M(x)}{(\hat{a})^2 k_{M+2}(x)} = \frac{g(D_N, D_{N+1})}{g(D_{N+2}, D_{N+3})\sqrt{M+2}\sqrt{M+1}} = \frac{d_{M+2}^{-1}}{\sqrt{M+1}\sqrt{M+2}}.$$

From this, it follows:

$$\frac{\sqrt{M+1}\sqrt{M+2}\, k_{M+2}(x)}{(\hat{a}^\dagger)^2 k_M(x)} \frac{\sqrt{M+1}\sqrt{M+2}\, k_M(x)}{(\hat{a})^2 k_{M+2}(x)} = 1.$$

For the generalized case that L−1 blocks are removed between the N-th block and the (N+L)-th block, where $k_{M+L-1}(x)=g(D_{N+L-1}, D_{N+L})f_{M+L-1}(x)$, it follows:

$$(\hat{a}^\dagger)^{L-1} k_M(x) = g(D_N, D_{N+L})(\hat{a}^\dagger)^{L-1} f_M(x) =$$

$$g(D_N, D_{N+L})\sqrt{\frac{(M+L-1)!}{M!}}\, f_{M+L-1}(x)$$

and $$(\hat{a})^{L-1} k_{M+L-1}(x) =$$

$$g(D_{N+L-1}, D_{N+L})(\hat{a})^{L-1} f_{M+L-1}(x) = g(D_{N+L})\sqrt{\frac{(M+L-1)!}{M!}}\, f_M(x),$$

from which, it follows:

$$\frac{k_{M+L-1}(x)}{(\hat{a}^\dagger)^{L-1} k_M(x)} =$$

$$\sqrt{\frac{M!}{(M+L-1)!}}\, \frac{g(D_{N+L-1}, D_{N+L})}{g(D_N, D_{N+L})} = \sqrt{\frac{M!}{(M+L-1)!}}\, d_{M+L-1}$$

and $$\frac{k_M(x)}{(\hat{a})^{L-1} k_{M+L-1}(x)} =$$

$$\sqrt{\frac{M!}{(M+L-1)!}}\, \frac{g(D_{N+L-1}, D_{N+L})}{g(D_{N+L-1}, D_{N+L})} = \sqrt{\frac{M!}{(M+L-1)!}}\, d_{M+L-1}^{-1}$$

where $d_{M+2}=g(D_{N+L-1}, D_{N+L})/g(D_{N+L-1}, D_{N+L})$ or $$\left[\sqrt{\frac{(M+L-1)!}{M!}}\, \frac{k_{M+L-1}(x)}{(\hat{a}^\dagger)^{L-1} k_M(x)}\right]\left[\sqrt{\frac{(M+L-1)!}{M!}}\, \frac{k_M(x)}{(\hat{a})^{L-1} k_{M+L-1}(x)}\right] = 1.$$

Embodiments may have the advantage that an efficient transformation process for transforming the linking process-specific functions of differing orders into one another is provided as a result of the use of the corresponding increment operator and the corresponding decrement operator. If the number of removed blocks is known, it is possible to check the remaining blocks for consistency. On the other hand, it is possible to determine the number of removed blocks by incrementally increasing the use of the increment operator and/or of the decrement operator. As soon as the above-defined consistency criterion is met, the number of times that the increment operator and/or decrement operator are applied corresponds to the number of removed blocks.

According to embodiments, the data to be stored includes data that is characteristic of the content of a digitally encoded document, wherein the provision of the data to be stored includes receiving the data by way of a communication interface via a network from a computer system creating the digitally encoded document, the method furthermore comprising:

receiving a request for a current version of the blockchain structure by way of the communication interface via the network from a requesting computer system; and transmitting the expanded blockchain structure by way of the communication interface via the network to the requesting computer system in response to the received request.

Embodiments may have the advantage that the integrity of a digitally encoded document may be checked based on the data recorded in the blockchain structure. For a present digitally encoded document, data that is characteristic of the content of this document may be calculated. For example, a hash value of the content of the digitally encoded document may be calculated. This data may be compared to the blockchain structure: If the blockchain structure includes the corresponding data, the integrity of the digitally encoded document is confirmed, and the document is acknowledged as authentic. If the blockchain structure does not include the corresponding data, the integrity of the digitally encoded document is denied. The blockchain structure may offer the advantage that the size thereof may be kept compact when the blockchain structure only includes hash values of the digitally encoded documents. Furthermore, it is not possible to infer the contents of the corresponding documents based on the hash values of the digitally encoded documents, thereby further increasing security. Finally, a current version of the blockchain structure may, for example, be downloaded via the network to a portable mobile telecommunications device, and be used to check digitally encoded documents, even if no network link made available, that is, the portable mobile telecommunications device is in an offline mode.

A "document" shall, in particular, be understood to mean news message, a text, a record, a credential or an identification, value or security document, in particular a document from a governing body, in particular a paper-based and/or plastic-based document, such as an electronic identification document, in particular a passport, an identification card, a visa, a driver's license, a vehicle registration, a vehicle title, a health insurance card or a company ID card, or another ID document, a chip card, a payment instrument, in particular a bank note, a bank card or a credit card, a bill of lading or other proof of authority. In particular, the document may be a machine-readable travel document, such as are standardized by the International Civil Aviation Organization (ICAO) and/or the German Federal Office for Information Security (BSI). A record is a declaration in text or written form which documents a particular statement of facts or presentation of facts. Moreover, the record may identify the issuer of the instrument.

A digitally encoded document shall be understood to mean a data construct for electronic data processing which comprises digitally encoded data. This may, in particular, be an electronic file having an arbitrary data format, such as a text, table, sound, image and/or video file. According to embodiments, the electronic file may be executable or non-executable. A digitally encoded document may, for example, be a document that was created in or translated into a file form by digitizing a document having a physical document body, that is, a conversion of the data encompassed by the physical document body into a binary code. In particular, the validity of such a document is independent from the existence of a permanently associated document body.

According to embodiments, a digitally encoded document may be created, for example, by generating a file including the data of the corresponding document on a computer. Furthermore, a virtual document may, for example, also be created by scanning or photocopying a physical document body, such as a document on paper.

According to embodiments, the data to be stored includes data of a transaction, the provision of the data to be stored comprising receiving the data by way of a communication interface via a network from a computer system involved in the completion of the transaction, the method furthermore comprising:
  receiving a request for a current version of the blockchain structure by way of the communication interface via the network from a requesting computer system; and
  transmitting the expanded blockchain structure by way of the communication interface via the network to the requesting computer system in response to the received request.

Embodiments may have the advantage that transactions may be logged based on the data recorded in the blockchain structure. The transactions may, for example, be transactions of a cryptocurrency, a traditional currency, a sale, a shipment, a conveyance of property or a transfer of an item and/or of a digitally encoded document.

According to embodiments, the data to be stored includes status data of a device, the provision of the data to be stored including receiving the data by way of a communication interface via a network from a computer system detecting the status data by way of a sensor, the method furthermore comprising:
  receiving a request for a current version of the blockchain structure by way of the communication interface via the network from a requesting computer system; and
  transmitting the expanded blockchain structure by way of the communication interface via the network to the requesting computer system in response to the received request.

Embodiments may have the advantage that the status and/or the status history of a device may be logged based on the status data recorded in the blockchain structure. For example, such a device may be a production device, a component of a computer system, a locking system, an access control device or a vehicle. A "vehicle" shall be understood to mean a mobile means of transportation here. Such a means of transportation may be used, for example, to transport goods (freight traffic), tools (machinery or auxiliary devices) or persons (passenger traffic). Vehicles also include, in particular, motor- or engine-driven means of transportation.

For example, a vehicle may be a land vehicle, a watercraft and/or an aircraft. A land vehicle may be, for example: an automobile, such as a passenger car, a bus or a truck, a motor-powered two-wheeler, such as a motorcycle, a moped, a motor scooter or a motor-driven bicycle, an agricultural tractor, a forklift truck, a golf cart or a truck-mounted crane. A land vehicle may moreover also be a rail-bound vehicle. A watercraft may be, for example: a ship or a boat. Furthermore, an aircraft may be, for example: an airplane or a helicopter. A vehicle shall, in particular, also be understood to mean a motor vehicle.

A "sensor" shall be understood to mean an element for detecting measuring data here. Measuring data is data that qualitatively or quantitatively expresses physical or chemical properties of a measuring object, such as amount of heat, temperature, moisture, pressure, sound field variables, electromagnetic field strength, brightness, acceleration, change in position, pH value, ionic strength, electrochemical potential, and/or the material makeup thereof. Measuring data is detected by way of physical or chemical effects and converted into an electronically processable electrical signal. Moreover, measuring data may express statuses and/or changes in status of electronic devices or as a result of a use by a user.

According to embodiments, the status data may also include data about functions carried out by the device. For example, in this way it is possible to log manufacturing and/or processing operations carried out by a production device. Furthermore, it is possible to log actions of an access control device, wherein the logged data may include information as to who gained access to a secured area via the access control device, and when.

According to embodiments, the data to be stored includes data characterizing a processing operation of a digitally encoded document, the provision of the blockchain structure including receiving the document to be processed, which includes the blockchain structure, and reading out the blockchain structure from the received document, the provision of the data to be stored including processing the received document and generating the data, and the storage of the expanded blockchain structure including adding the expanded blockchain structure to the processed document and storing the processed document including the expanded blockchain structure.

Embodiments may have the advantage that a processing operation of a digitally encoded document may be logged based on the data recorded in the blockchain structure. For example, it may be logged who accessed the document, and when, and whether or what changes were made to the document. Furthermore, it is possible, for example, to log copying processes of the document and to add the expanded blockchain structure to the created copy. In this case, the blockchain structure includes a history of origin of the created copy.

According to embodiments, the method furthermore comprises:

receiving a request for the processed document by way of a communication interface via a network from a requesting computer system; and transmitting the processed document including the expanded blockchain structure by way of the communication interface via the network to the requesting computer system in response to the received request.

Embodiments may have the advantage that the processing history and/or history of origin of the processed document may be tracked and/or verified based on the blockchain structure.

The document may, in particular, be a news message, such as in the form of a website, or a file or a posting linked to a website or integrated into a website. A website or web document, Internet page or web page shall be understood to mean a document provided over the Internet, which is made available by a web server, for example, and may be accessed using a browser of a user computer system by entering a uniform resource locator (URL). This is an HTML document, for example. A posting here shall be understood to mean an individual article on an Internet platform, such as a social media platform, on a web forum or a blog.

Embodiments comprise an electronic data storage system for storing data in a tamper-proof manner in a bidirectionally linked blockchain structure. The data storage system comprises a processor and an electronic storage device including machine-readable instructions, wherein an execution of the machine-readable instructions by the processor prompts the data storage system to carry out a method, comprising:

providing the bidirectionally linked blockchain structure;
providing the data to be stored;
generating an additional block for expanding the blockchain structure, which includes the data to be stored and is intended to be linked bidirectionally to the last block of the blockchain structure, the last block of the blockchain structure including stored data;
calculating a block-dependent linking function for bidirectionally linking the last block to the additional block, the calculation of the linking function comprising:
calculating a combined block-dependent check value of the last block and of the additional block, using the data stored in the last block and the data to be stored in the additional block;
associating the combined check value with a block-independent, linking process-specific function;
adding the block-dependent linking function to the last block;
adding the block-dependent linking function to the additional block; and
storing the blockchain structure expanded by the additional block.

According to embodiments, the electronic data storage system is configured to carry out one or more of the aforementioned embodiments of the method for storing data in a tamper-proof manner.

According to embodiments, the electronic data storage system comprises a file system. The file system provides organized filing on the data storage unit. Data, such as digitally encoded documents, may be stored on the data storage unit as files. Furthermore, the files may be read, modified or deleted.

According to embodiments, the electronic data storage system comprises a database. A database or a database system refers to a system for electronic data management. A database system allows large volumes of data to be stored efficiently, consistently and permanently, and required subsets to be provided in various demand-based forms of representation for users and application programs. The database system comprises, for example, a database management system and a database in the narrower sense, or a data platform. The database management system provides management software for managing data of the database. The management software internally organizes the structured storage of the data and controls all read and write access to the database. The data platform encompasses the volume of data to be managed. Data, such as digitally encoded documents, for example, is stored as part of the data platform in this case.

The storage device may comprise a removable storage device, for example, that is, a data carrier for a computer system which is not fixedly installed, replaceable and/or portable. For example, removable storage devices include Blu-ray discs, CDs, diskettes, DVDs, HD DVDs, magnetic tapes, MO/MODs, solid state drives (SSDs), memory cards, USB sticks or removable hard disks.

Embodiments comprise a telecommunications system, which comprises the aforementioned electronic data storage system and a communication interface for communicating via a network, the provision of the data to be stored including receiving the data by way of a communication interface via a network, the carried-out method furthermore comprising:

receiving a request for a current version of the blockchain structure by way of the communication interface via the network from a requesting telecommunications system; and transmitting the expanded blockchain structure by way of the communication interface via the network to the requesting telecommunications system in response to the received request.

For example, the telecommunications system is a computer system configured to communicate via a network.

A network may, for example, encompass a local network, in particular a local area network (LAN), a private network, in particular an Intranet, or a virtual private network (VPN). For example, the computer system may comprise a standard radio interface for connection to a WLAN. Furthermore, it may be a public network, such as the Internet. Furthermore, it may be a digital cellular mobile communication network, for example.

A "computer system" here shall be understood to mean a device processing data by way of programmable processing rules using electronic circuits. A "program" or "program instructions" here shall be understood to mean any type of computer program, without restriction, that includes machine-readable instructions for controlling a functionality of the computer.

A computer may comprise an interface for connecting to the network, wherein the network may be a private or public network, and in particular the Internet or another communication network. Depending on the embodiment, this connection may also be established via a mobile communication network.

A computer system may, for example, be a mobile telecommunications device, and in particular a smart phone, a portable computer, such as a laptop or palmtop computer, a personal digital assistant or the like. Furthermore, this may be a smart watch or smart glasses, for example. Moreover, this may be a stationary computer system, such as a personal computer, for example, or a server integrated in a client server environment. In particular, this may be a server comprising a database management system, which manages a database including data.

A "storage device" or "data storage device" here shall be understood to mean both volatile and non-volatile electronic storage devices, and digital storage media.

A "non-volatile memory" here shall be understood to mean an electronic storage device for permanently storing data. A non-volatile memory may be configured as a non-changeable memory, which is also referred to as ready-only memory (ROM) or as a changeable memory, which is referred to simply as a non-volatile memory (NVM). In particular, this may be an EEPROM, for example a flash EEPROM, referred to as flash for short. A non-volatile memory is characterized in that the data stored therein is preserved even after the power supply is turned off.

A "volatile electronic storage device" here shall be understood to mean a storage device for temporarily storing data, which is characterized in that all the data is lost after the power supply is turned off. In particular, this may be a volatile direct access memory, which is also referred to as random access memory (RAM), or a volatile main memory of the processor.

A "processor" here and hereafter shall be understood to mean a logic circuit used to execute program instructions. The logic circuit may be implemented on one or more discrete components, and in particular on a chip. In particular, a "processor" shall be understood to mean a microprocessor or a microprocessor system comprising multiple processor cores and/or multiple microprocessors.

An "interface" or "communication interface" here shall be understood to mean an interface via which data may be received and sent, wherein the communication interface may be configured to be equipped with contacts or in a contactless manner. The communication interface may be an internal interface or an external interface, which is connected to an associated device by means of a cable or wirelessly, for example. A communication interface for wireless communication shall be understood to mean a communication interface configured to send and receive data in a contactless manner. The communication may take place according to an RFID and/or NFC standard, such as Bluetooth, for example. Furthermore, the communication interface may be configured for communicating via a local wireless network, for example according to a standard of the IEEE-802.11 family and/or Wifi.

An interface may be configured as a wireless interface, for example, which enables communication via a digital cellular mobile communication network, which may composed according to a wireless communication standard, such as GSM, UMTS, LTE, CDMA or another standard.

Communication may generally take place via a network, for example. A "network" here shall be understood to mean any transmission medium having a connection for communication which enables communication between at least two computer systems. A network may, for example, encompass a local network, in particular a local area network (LAN), a private network, in particular an Intranet, or a virtual private network (VPN). For example, the computer system may comprise a standard radio interface for connection to a WLAN. Furthermore, it may be a public network, such as the Internet.

Embodiments include a telecommunications system, which comprises the aforementioned electronic data storage system and a communication interface for communicating via a network, wherein the data to be stored includes data characterizing a processing operation of a digitally encoded document, the provision of the blockchain structure including receiving the document to be processed, which includes the blockchain structure, and reading out the blockchain structure from the received document, the provision of the data to be stored including processing the received document and generating the data, and the storage of the expanded blockchain structure including adding the expanded blockchain structure to the processed document and storing the processed document including the expanded blockchain structure, the carried-out method furthermore comprising:

receiving a request for the processed document by way of a communication interface via the network from a requesting telecommunications system; and transmitting the processed document including the expanded blockchain structure by way of the communication interface via the network to the requesting telecommunications system in response to the received request.

According to embodiments, the transmission of the digitally encoded document takes place in response to a receipt of a request for transmission. For example, the digitally encoded document is an HTML document. For example, the digitally encoded document is provided on an Internet platform, for example as a website or as a posting. A posting here shall be understood to mean an individual article on an Internet platform, such as a social media platform, on a web forum or a blog. Furthermore, the digitally encoded document may be provided for downloading. For example, a website or a posting includes a link for accessing the digitally encoded document.

In response to an appropriate request, such as in the form of a HTTP GET request, the digitally encoded document is transmitted to the requesting computer system.

According to alternative embodiments, the transmission of the digitally encoded document takes place independently from a request for transmission. For example, the document is transmitted in the form of an e-mail, an instant message, a sound message, a video message, an image message, an SMS message or an MMS message or is encompassed by one of the aforementioned message types. Instant messaging denotes a communication method in which two or more users communicate with one another by digitally encoded text, voice, image and/or video messages. The sender triggers the transmission of the message, that is, a so-called push method is employed, so that the messages are received by the intended recipient as directly as possible. The users may be connected to one another directly or by a server using a computer program via a network, such as the Internet.

Embodiments of the invention will be described in more detail hereafter with reference to the drawings. In the drawings.

Elements of the following embodiments that correspond to each other are denoted by the same reference numerals.

Figure 1:
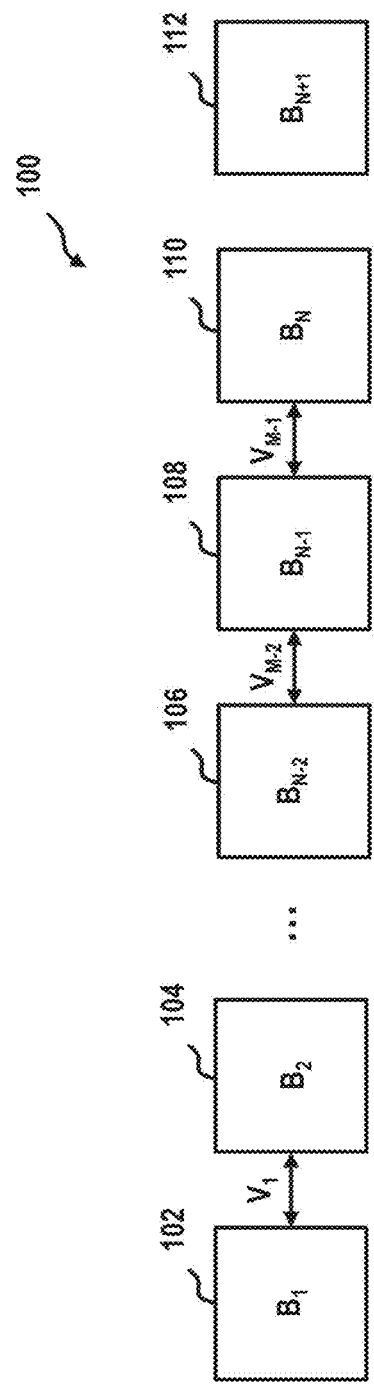
FIG. 1 shows a schematic block diagram of one embodiment of an exemplary blockchain structure.

FIG. 1 shows an embodiment of an exemplary blockchain structure 100, which includes N blocks 102, 104, 106, 108, 110. The blockchain structure 100 is to be expanded by an additional block 112. The blocks 102, 104, 106, 108, 110 of the blockchain structure 100 are bidirectionally linked to one another by block-dependent linking functions. The individual bidirectional connections or concatenations $V_1$, $V_{M-2}$, $V_{M-1}$ are schematically indicated by double arrows. The inner blocks 104, 106, 108 of the blockchain structure 100 each comprise a combined block-dependent linking function, which is the result of associating two block-dependent linking functions with one another. For example, a first of the two associated block-dependent linking functions comprises a check value, which is dependent on the data of the corresponding inner block and on the data of the immediately preceding block. The second of the two associated linking functions comprises a check value, for example, which is dependent on the data of the corresponding inner block and on the data of the immediately following block. The corresponding block-dependent linking functions, that is, the association of the first and second linking functions, are integrated into the respective blocks.

The check value of the linking function for linking the last block 110 of the blockchain structure 100 in the additional block 112, that is, for creating the bidirectional connection $V_M$, comprises both data stored in the last block 110 and data to be stored in the additional block 112. The linking function stored in the last block 110 and in the additional block 112 as part of the linking process thus only represents the correct check value of the two corresponding blocks as long as the data of the two blocks is not altered. In the event of tampering, for example of the additional block 112, the check value of the last block 110, and thus the corresponding linking function of the connection between the last block 110 and the additional block 112, no longer matches the data of an additional block 112. A corresponding manipulation is identifiable as a function of this deviation. The linking function for creating the bidirectional connection VM furthermore comprises a block-independent, linking process-specific function, which is dependent on M, for example.

Figure 2:
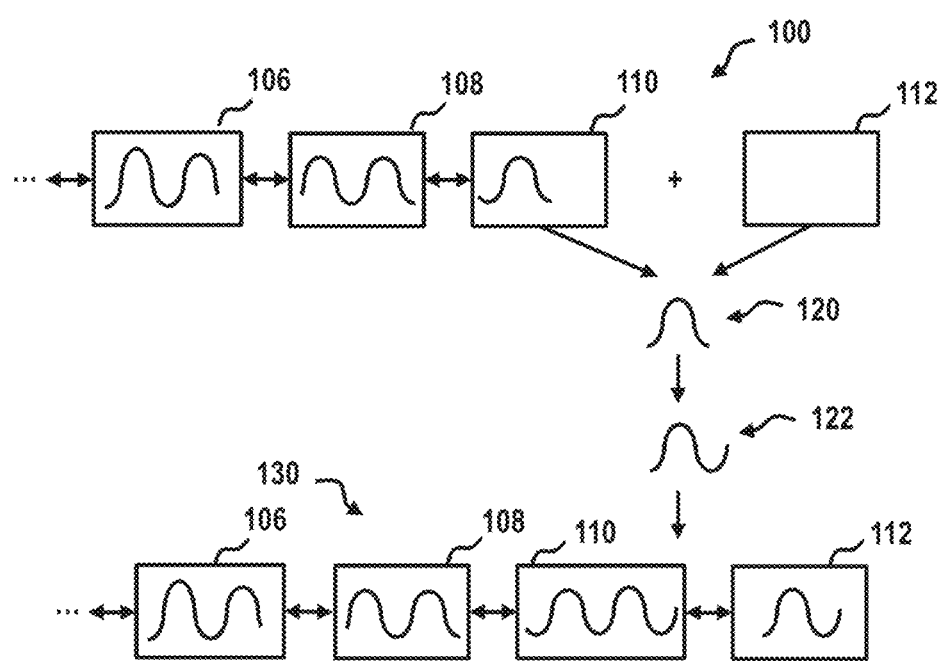
FIG. 2 shows a schematic flow chart of an exemplary method for creating a bidirectional blockchain structure.

FIG. 2 shows a schematic block diagram of the method for expanding the blockchain 100 from FIG. 1 by the block 112. The blocks 106, 108, 110 of the blockchain structure 100 each comprise a block-dependent linking function, which is schematically indicated by function curves. The blocks in the blockchain structure 100, such as the penultimate block 108 and the antepenultimate block 106, each comprise a block-dependent bidirectional linking function, which is an association of the block-dependent bidirectional linking functions of the bidirectional connections with the preceding block, for example block 106 in the case of block 108, and to the subsequent block, for example block 110 in the case of block 108. The corresponding block-dependent linking functions are integrated into the corresponding blocks 106, 108 in the form of mathematical functions. The respective block-dependent linking functions were each generated using the data of two blocks to be linked to one another. Furthermore, the corresponding linking functions are each linking process-dependent, as a result of the comprised block-independent, linking process-specific functions. The combined linking functions, which represent an association of a plurality of linking functions, are thus dependent on a plurality of links or bidirectional connections.

For example, a functional 112 is provided for bidirectionally linking the last block 110 of the blockchain structure 100 to the additional block 112. A specific block-independent, linking process-specific function is derived from the functional 112. This function is associated with a check value of the data of the two blocks to be linked to one another, that is, block 110 and block 112. For example, a corresponding association may be an arithmetic operation, such as an addition, a subtraction, a multiplication and/or a division. A block-dependent bidirectional linking function 122, which is unambiguously assigned to the bidirectional connection between block 110 and block 112 and depends on both the data of block 110 and the data of block 112, may thus be derived from the shared comprehensive function 120. The block-dependent bidirectional linking function 122 is added both to block 110 and to block 112 for bidirectionally linking the block 110 to the block 112. In the process, the linking function 122 is associated with the linking function of the bidirectional concatenation between block 108 and block 110 which is already present in the block 110.

Figure 3:
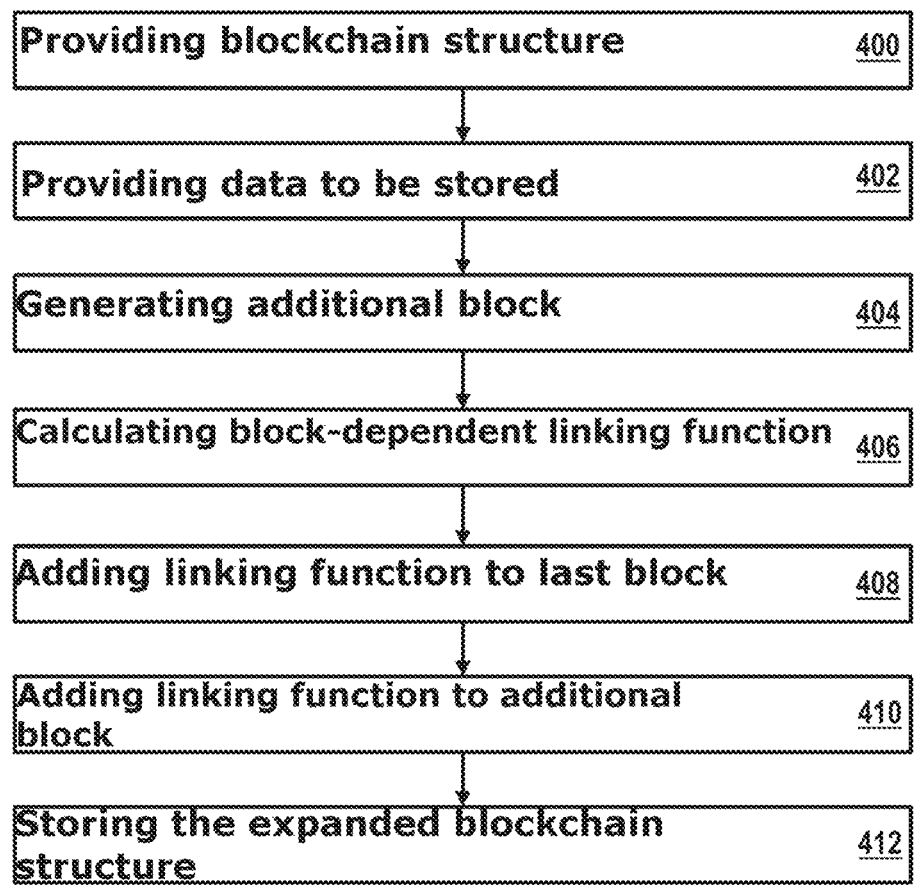
FIG. 3 shows a schematic flow chart of an exemplary method for creating a bidirectional blockchain structure.

FIG. 3 shows an embodiment of an exemplary method for expanding a bidirectionally linked blockchain structure by an additional block. In step 400, a bidirectionally linked blockchain structure is provided. In step 402, the data to be stored is provided. In step 404, an additional block is generated for expanding the blockchain structure. The additional block comprises the data to be stored and is intended to be linked bidirectionally to the last block of the blockchain structure. In step 406, a block-dependent linking function for bidirectionally linking the last block of the blockchain structure to the additional block is calculated. For this purpose, a combined block-dependent check value is calculated, which comprises both data of the last block of the blockchain structure and data of the additional block to be added. In particular, the check value may comprise the linking function for bidirectionally linking the last block of the blockchain structure to the penultimate block of the blockchain structure. Furthermore, a block-independent, linking process-specific function is provided. The block-independent, linking process-specific function may be derived from a functional, for example. A function is selected in the process, which is unambiguously assigned in the linking process or the bidirectional connection between the last block of the blockchain structure and the additional block. A corresponding assignment may be implemented by a corresponding ordinal number of the linking process-specific function, for example. The linking process-specific function is associated with the check value. A corresponding association may take place, for example, in the form of an arithmetic operation. For example, the linking process-specific function may be multiplied with the check value. In step 408, the linking function calculated in step 406 is added to the last block of the blockchain structure. In step 410, the linking process-specific function is added to the additional block. According to embodiments, the step 408 comprises associating the linking function calculated in step 406 with the linking function of the bidirectional connection between the last block and the penultimate block of the blockchain structure which was already present in the last block. The corresponding association may be an arithmetic operation, for example. For example, the two linking functions may added to one another.

Figure 4:
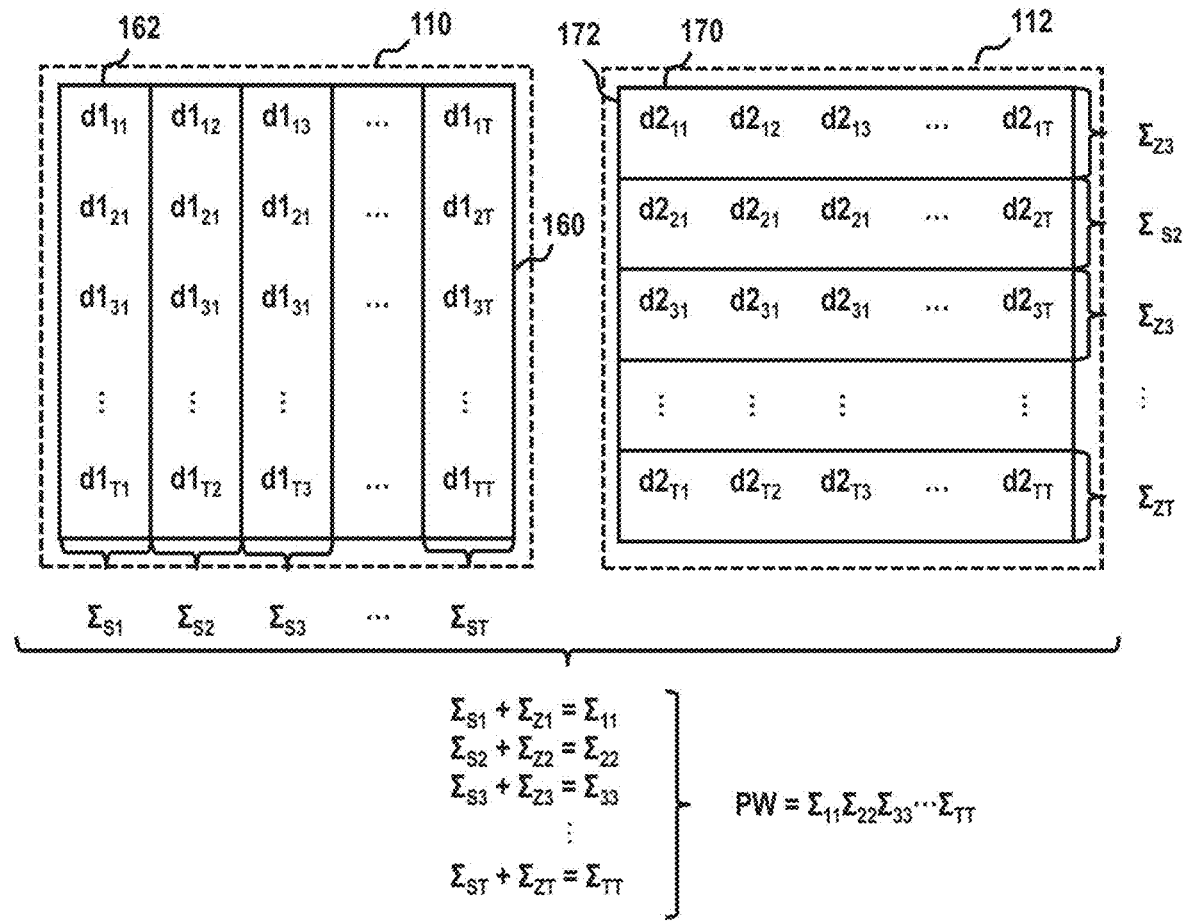
FIG. 4 shows a schematic block diagram of an exemplary method for creating a combined block-dependent check value.

FIG. 4 shows a schematic block diagram of a calculation of the check value of two blocks 110, 112 to be linked to one another, such as is encompassed by step 406 of FIG. 3. The data of the two blocks 110, 112 to be linked to one another is stored in each case in a square (T×T) matrix structure 160, 170, for example. T is a natural number T≥2, for example. If the matrix structures 160, 170 of the two blocks 110, 112 have different sizes, one or both matrix structures 160, 170 are expanded in such a way that two square matrix structures of equal size are obtained. For this purpose, for example, additional matrix elements or additional rows and/or columns are added. Each of the added matrix elements comprises a placeholder, for example the value 0. If, for example, the matrix structure of block 110 has one column less, that is, if, for example, the T-th column is missing, this column is added, wherein all the elements of the T-th column $D1_{1T}$ to $D1_{TT}$ are set to 0. So as to calculate the combined block-dependent check value PW, for example, the sum of all the elements of the corresponding column 162 is calculated for each column 162 of the matrix structure 160 of the block 110. For the i-th column, the sum $\Sigma_{Si}=\Sigma_{j=1}^{T} d1_{ji}$ is obtained. Moreover, the sum of all the elements of the corresponding row 172 is calculated for each of the rows 172 of the matrix structure 170 of the block 112. For the i-th row, the sum $\Sigma_{Zi}=\Sigma_{j=1}^{T} d2_{ij}$ is obtained. In a next step, the sum $\Sigma_{Si}$ calculated for the i-th column of the matrix structure 160 of block 110 is added to the sum $\Sigma_{Zi}$ of the i-th row of the matrix structure 170 of block 112. The resulting T sums $\Sigma_{11}$ to $\Sigma_{TT}$ are stringed together, yielding a sequence of numbers that forms the combined block-dependent check value: $PW=\Sigma_{11}\Sigma_{22} \ldots \Sigma_{T-1T-1}\Sigma_{TT}$. According to alternative embodiments, it would also be possible to create the sums across the rows of the matrix structure 160, and the sums across the columns of the matrix structure 170, for calculating the combined check value.

Figure 5:
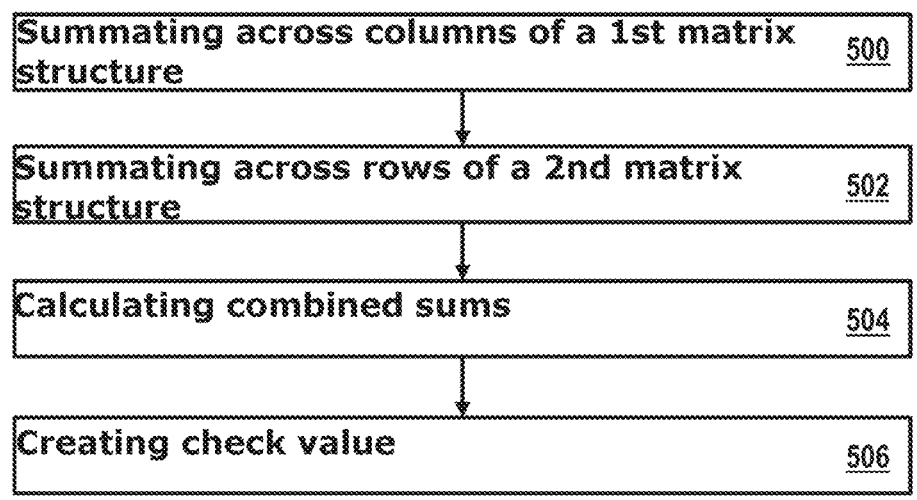
FIG. 5 shows a schematic flow chart of an exemplary method for creating a combined block-dependent check value.

FIG. 5 shows an exemplary method for calculating a combined block-dependent check value according to FIG. 4. In step 500, a sum from all the elements of the corresponding column is calculated for each column of a matrix structure of a first block. In step 502, a sum from all the elements of the corresponding row is calculated for each row of a matrix structure of a second block, which is to be bidirectionally linked to the first block. In step 504, a row of the matrix of the second block is assigned to each column of the matrix of the first block. For example, the i-th column is assigned to the i-th row. A combined sum is calculated for each of the resulting pairs of the corresponding i-th column of the matrix structure of the first block and of the i-th row of the matrix structure of the second block. In step 506, the sums calculated in step 504 are stringed together in a sequence of numbers, thereby forming a combined block-dependent check value.

Figure 6:
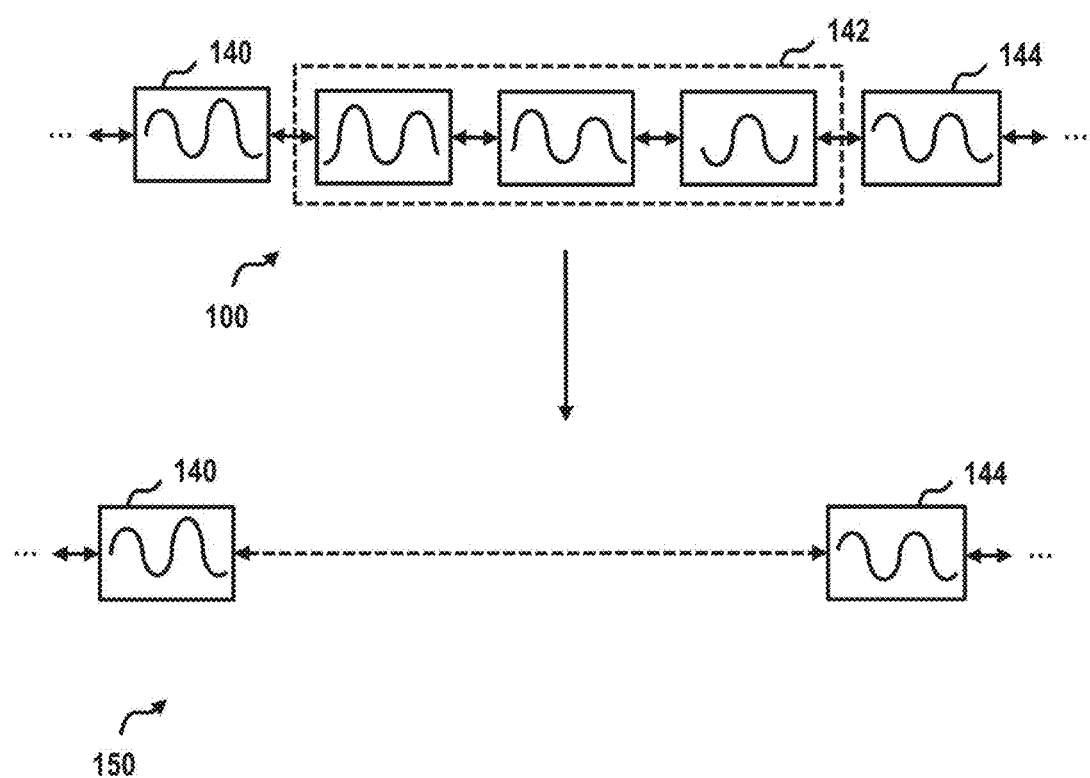
FIG. 6 shows a schematic flow chart of an exemplary method for creating a shortened bidirectional blockchain structure.

FIG. 6 shows an exemplary bidirectionally linked blockchain structure 100 that is to be shortened, creating a shortened blockchain structure 150. For this purpose, an inner chain segment 142 is removed between the blocks 140 and 144. The removed inner chain segment 142 may comprise critical data, in terms of security, for example. The inner chain segment 142, for example, comprises a plurality of consecutive blocks of the blockchain structure 100. After the chain segment 142 has been removed, the blocks 140 and 144 form neighboring blocks. These neighboring blocks 140 and 144 are connected to one another by the linking functions thereof. However, this connection is a connection by the block-independent, linking process-specific functions, which comprise the linking functions. The bidirectional connection is therefore indicated by a dotted double arrow. The linking process-specific functions are assigned to the individual bidirectional connections or concatenations according to a predefined assignment pattern, for example according to an ascending order. Using this ordered assignment, it is furthermore possible to check the blockchain structure for consistency based on the linking process-specific functions and the mutual dependencies thereof, which results from the derivation from a shared functional. In the case of FIG. 6, for example, the linking process-specific function of the block 140 may be transformed into the linking process-specific function of the block 144 by applying the increment operator three times, or the linking process-specific function of the block 144 may be transformed into the linking process-specific function of the block 140 by applying the decrement operator three times.

According to embodiments, a block-dependent linking function may additionally take place for creating a bidirectional concatenation between the block 140 and the block 144, which is dependent both on the data of block 140 and on the data of block 144 and all the blocks of the segment 142. For this purpose, the linking functions of the blocks of the inner chain segment 142 are associated with one another, whereby a combined bidirectional linking function is created. This combined bidirectional linking function is dependent on the data of all the blocks of the inner chain segment 142 and of the blocks 140 and 144 adjoining the inner chain segment 142. For example, the individual bidirectional linking functions are associated with one another by an arithmetic operation, encompassing an addition, a subtraction, a multiplication and/or a division, for example. The two blocks 140 and 144 of the shortened blockchain structure 150, which result after the inner chain segment 142 has been removed from the blockchain structure 100, are linked to one another, using the combined bidirectional linking function. As a result, the two blocks 140 and 144, which form loose ends of the blockchain structure 150 after the inner chain segment 142 has been removed, are bidirectionally connected to one another not only with respect to the linking process-specific functions, but also with respect to the data thereof. For this purpose, for example, the linking functions of the blocks 140, 144 are expanded in such a way that these completely comprise the combined bidirectional linking function. In this way, a shortened bidirectionally linked blockchain structure 150 is created, in which all the blocks are bidirectionally linked to one another not only with respect to the sequence of the associations thereof, but also with respect to the data thereof. The resulting blockchain structure 150 is, in particular, still dependent on the removed inner chain segment 142. If the removed inner chain segment 142 is provided to complement the shortened blockchain structure 150, it is possible to check whether the provided inner chain segment is authentic by using the expanded bidirectional linking functions of the blocks 140, 144. If the provided inner chain segment is authentic, that is, identical to the removed inner chain segment 142, the shortened blockchain structure may be used to complement the original complete blockchain structure 100. In this way, it is possible, for example, to complement blocks with critical data, in terms of security, which was previously removed to protect the security-critical data.

Figure 7:
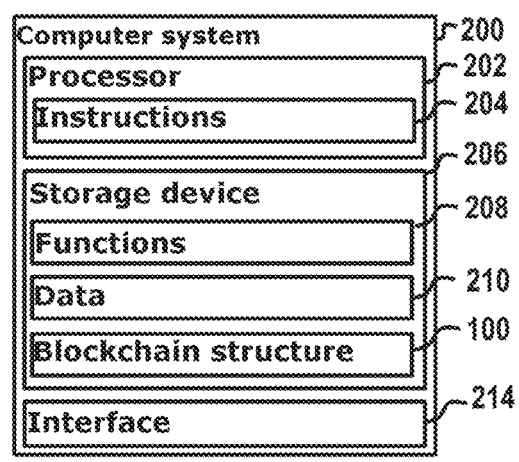
FIG. 7 shows a schematic block diagram of one embodiment of an exemplary data storage system.

FIG. 7 shows a schematic block diagram of one embodiment of an exemplary data storage system 200 in the form of a computer system for storing data 210 in a tamper-proof manner in an electronic storage device 206, using a bidirectionally linked blockchain structure 100.

The computer system 200 comprises a processor 202 which is configured to execute program instructions 204. By executing the program instructions 204, the processor 202 controls the computer system 200 so as to carry out one of the above-described embodiments of the method for storing data in a tamper-proof manner.

The computer system 200 furthermore comprises a storage device 206 in which functions 208 for calculating bidirectional linking functions, that is, for calculating or deriving block-dependent combined check values and block-independent, linking process-specific functions, and the bidirectionally linked blockchain structure 100 are stored. The storage device 206 moreover includes data 210, which is to be protected against manipulation or stored in a tamper-proof manner, using a bidirectionally linked blockchain structure 100. For example, the computer system 200 carries out one of the methods according to FIGS. 2 and 3 and generates an additional block for the blockchain structure 100, which includes the data 210 to be stored in a tamper-proof manner and is being bidirectionally linked to the last block of the blockchain structure 100. For bidirectionally linking the additional block, a combined check value is calculated using the functions 208, which include the data 210 and data from the blockchain structure 100, and is associated with a linking process-specific function.

Finally, the computer system 200 comprises a communication interface 214. For example, this communication interface 214 may be a network interface for communicating via a network or an interface for communicating with a removable medium. The data 210 and/or the blockchain structure 100 may be provided via the communication interface 214, for example. The communication interface 214 may furthermore be a user interface for entering commands by a user and/or for outputting results.

According to embodiments, the program instructions 204 may include a database management system, for example, which manages blockchain structures, such as blockchain structure 100, stored in the storage device 206, for example.

Figure 8:
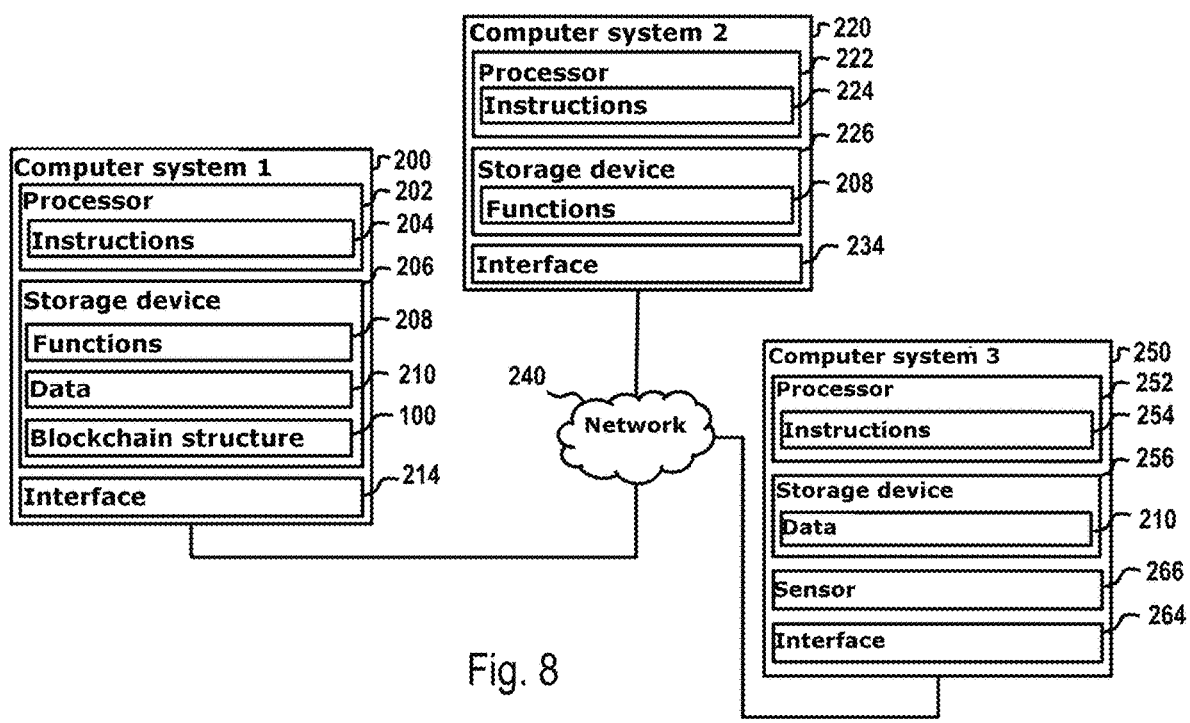
FIG. 8 shows a schematic block diagram of one embodiment of an exemplary telecommunications system.

FIG. 8 shows the exemplary data storage system 200 from FIG. 7, which is configured as a telecommunications system able to communicate with other computer systems, such as the computer systems 220, 250, by way of the communication interface 214 via the network 240. For example, the data 210 is provided by the computer system 250 via the network 240.

The computer system 250 comprises a storage device 256, for example, for storing the data 210 to be protected against manipulations by the computer system 200. According to embodiments, the data 210 is data characteristic of a digitally encoded document. For example, the data 210 is a hash value of the content of a digitally encoded document. According to further embodiments, the data 210 is transaction data of a transaction prompted, logged and/or carried out by the computer system 250. According to further embodiments, the data 210 is sensor data detected by way of a sensor 266 of the computer system 250. The computer system 250 furthermore comprises a processor 252, which is configured to execute program instructions 254. According to embodiments, the computer system 250 may also bee configured as a telecommunications system, which is able to communicate with the computer systems 200 by way of the communication interface 264 via the network 240. The computer system 250 is prompted to transmit the data 210 to the computer system 200, for example, when the program instructions 254 are executed by the processor 252. The transmission of the data 210 via the network 240 may, for example, take place in response to a request from the computer system 200 or at the own initiative of the computer system 250.

FIG. 8 furthermore shows the computer system 220, which is also configured as a telecommunications system and able to communicate with the computer systems 200 by way of the communication interface 264 via the network 240. For example, the computer system 220 comprises a processor 222 including program instructions 224. The processor 222 is configured to execute the program instructions 224, an execution of the program instructions 224 by the processor 222 prompting the computer system 220 to request the blockchain structure 100 expanded by the data 210 via the network from the computer system 200. In response to a corresponding request, the computer system 220 receives the blockchain structure 100, for example. According to embodiments, the computer system 220 is able to read out the data stored in the blockchain structure 100 from the blockchain structure 100. The computer system 220 may check the integrity of the read-out data, for example, using the functions 208 stored in the storage device 226. Using the functions 208, it is possible to recalculate the block-dependent bidirectional linking functions of the blockchain structure 100, which bidirectionally link the blocks of the blockchain structure 100 to one another, and to check these for consistency or integrity. The read-out data is data to verify the authenticity of a digitally encoded document, for example. The corresponding document is provided to the computer system 220 by the computer system 250 via the network 240, for example. If the read-out data is a hash value of the content of the document, for example, it is possible to check the authenticity of the provided document based on this data. For example, a hash value is calculated for the document by the computer system 220. If the calculated hash value agrees with the read-out data, the provided document is acknowledged as authentic.

The blockchain structure 100 received by the computer system 220 may, in particular, also be used for checks in the offline mode, that is, when the network 240 is temporarily not available. Data to be checked for the authenticity thereof by way of the blockchain structure 100 is received or read in directly by the computer system 220, for example, without the network 240. This data may then be checked for the authenticity thereof, using the blockchain structure 100.

LIST OF REFERENCE NUMERALS 100 blockchain structure
102 first block
104 second block
106 antepenultimate block
108 penultimate block
110 last block
112 additional block
120 shared comprehensive function
122 bidirectional linking function
130 expanded blockchain structure
140 block
142 inner chain segment
144 block
150 shortened blockchain structure
160 matrix structure
162 column
170 matrix structure
172 row
200 computer system 202 processor
204 program instructions
206 storage device
208 functions
210 data
214 communication interface
220 computer system
222 processor
224 program instructions
226 storage device
234 communication interface
240 network
250 computer system
252 processor
254 program instructions
256 storage device
264 communication interface
266 sensor

The invention claimed is:

1. A method for storing data in a tamper-proof manner in an electronic storage device, using a bidirectionally linked blockchain structure, the method comprising:
   providing the bidirectionally linked blockchain structure;
   providing the data to be stored;
   generating an additional block for expanding the blockchain structure, which includes the data to be stored and is intended to be linked bidirectionally to a last block of the blockchain structure, the last block of the blockchain structure including stored data;
   calculating a first block-dependent linking function for bidirectionally linking the last block to the additional block, the calculation of the linking function comprising:
      calculating a combined block-dependent check value of the last block and of the additional block, using the data stored in the last block and the data to be stored in the additional block;
      associating the combined check value with a block-independent, linking process-specific function;
   adding the first block-dependent linking function to the last block;
   adding the first block-dependent linking function to the additional block; and
   storing the blockchain structure expanded by the additional block.

2. The method according to claim 1, wherein the last block of the blockchain structure furthermore comprises a second block-dependent linking function of a bidirectional concatenation of the last block to a penultimate block of the blockchain structure,
   the addition of the first block-dependent linking function to the last block comprising associating the first block-dependent linking function with the second block-dependent linking function.

3. The method according to claim 1, wherein the block-independent, linking process-specific function is a function of a family of functions, which comprises a plurality of block-independent, linking process-specific functions, an ordinal number being assigned to each function of the family of functions, and the functions of the family of functions, starting with a first ordinal number assigned to a first bidirectional concatenation of the bidirectionally linked blockchain structure between a first block and a second block of the chain structure, according to a predefined assignment rule being intended to be individually assigned, in ascending order, to a bidirectional concatenation of two blocks of the bidirectionally linked blockchain structure and to be used to calculate a linking function dependent on the corresponding two blocks.

4. The method according to claim 3, wherein the block-independent, linking process-specific function comprises a polynomial of the M-th order, M being a natural number.

5. The method according to claim 4, wherein the block-independent, linking process-specific function comprises an association of the polynomial of the M-th order with an exponential function, an exponent of the exponential function comprising a polynomial of the order greater than or equal to two.

6. The method according to claim 1, wherein the calculation of the combined block-dependent check value of the last and of the additional blocks comprises applying a hash function to the data stored in the last block and the data to be stored in the additional block.

7. The method according to claim 1, wherein the data in the blocks of the blockchain structure is stored in each case in a square (T×T) matrix structure, T being a natural number greater than or equal to two, the calculation of the combined block-dependent check value of the last block and of the additional block comprising:
   calculating a sum across each column of a first matrix structure, which is provided by the two matrix structures of the data stored in the last block and of the data to be stored in the additional block;
   calculating a sum across each row of a second matrix structure, which is provided by the two matrix structures of the data stored in the last block and of the data to be stored in the additional block;
   calculating the combined sum from the sum of the i-th column and the sum of the i-th row, i being a natural number and running from 1 to T; and
   forming the combined block-dependent check value by associating the combined sums with one another.

8. The method according to claim 7, wherein an association of the combined sums with one another comprises stringing together the combined sums.

9. The method according to claim 1, wherein consecutive blocks of the bidirectionally linked blockchain structure are each bidirectionally linked to one another, two blocks bidirectionally linked to one another in each case comprising a shared block-dependent linking function, the shared block-dependent linking function in each case comprising a combined block-dependent check value of the data stored in the two consecutive blocks.

10. The method according to claim 1, wherein the blockchain structure is replaced by a shortened blockchain structure, the shortened blockchain structure being shortened by at least one inner chain segment of the blockchain structure, the inner chain segment comprising at least one block.

11. The method according to claim 10, wherein the method furthermore comprises:
   providing block-independent transformation functions, which are configured to transform the block-independent, linking process-specific functions of the block-dependent linking functions into one another; and
   checking the shortened blockchain structure for consistency, the block-independent, linking process-specific functions of the block-dependent linking functions of two directly neighboring blocks of the shortened blockchain structure between which the inner chain segment was removed being transformed into one another, using the transformation functions, and the transformation results being checked for consistency.

12. The method according to claim 11, wherein the block-independent transformation functions are configured, as increment operators, to transform each of the block-independent, linking process-specific functions of the block-dependent linking functions into the next higher block-independent, linking process-specific function according to an ascending order and/or, as decrement operators, to transform each of the block-independent, linking process-specific functions of the block-dependent linking functions into a next lower block-independent, linking process-specific function according to the ascending order.

13. The method according to claim 1, wherein the block-dependent linking function $k_M(x)$ has the following form:

$$k_M(x) = g(D_N, D_{N+1}) f_M(x)$$

where $g(D_N, D_{N+1})$ denotes the combined block-dependent check value of the N-th and (N+1)-th blocks of the blockchain structure, $D_N$ denotes the data stored in the N-th block, and $D_{N+1}$ denotes the data to be stored in the (N+1)-th block, wherein the block-independent, linking process-specific function $f_M(x)$ has the following form:

$$f_M(x) = c\, H_M(\sqrt{b}\, x)\, e^{-\frac{1}{2} b x^2},$$

where M denotes a natural number, which is unambiguously assigned to the individual linking process, where b and c are each an established parameter, and x denotes a variable, and wherein $H_M(\sqrt{b}x)$ denotes a Hermite polynomial having the following form:

$$H_M(\sqrt{b}\, x) = (-1)^M e^{b x^2} \frac{d^M}{d(\sqrt{b}\, x)^M}\left(e^{-b x^2}\right).$$

14. The method according to claim 13, wherein the transformation functions comprise a increment operator having the form:

$$\hat{a}^\dagger = \sqrt{\frac{b}{2}}\left(x - b^{-1}\frac{d}{dx}\right)$$

and a decrement operator having the form:

$$\hat{a} = \sqrt{\frac{b}{2}}\left(x + b^{-1}\frac{d}{dx}\right)$$

and consistency exists between the N-th and the (N+L)-th blocks between which an inner chain segment including the blocks N+1 through N+L−1 was removed, if $$\frac{(\hat{a}^\dagger)^{L-1} k_M(x)}{k_{M+L-1}(x)} = \frac{c\, k_M(x)}{(\hat{a})^{L-1} k_{M+L-1}(x)}$$

applies, where c is a constant.

15. The method according to claim 1, wherein the data to be stored includes data that is characteristic of a content of a digitally encoded document, the providing the data to be stored including receiving the data by way of a communication interface via a network from a computer system creating the digitally encoded document, the method furthermore comprising:
 receiving a request for a current version of the blockchain structure by way of the communication interface via the network from a requesting computer system; and
 transmitting the expanded blockchain structure by way of the communication interface via the network to the requesting computer system in response to the received request.

16. The method according to claim 1, wherein the data to be stored includes data of a transaction, the providing the data to be stored including receiving the data by way of a communication interface via a network from a computer system involved in carrying out the transaction, the method furthermore comprising:
 receiving a request for a current version of the blockchain structure by way of the communication interface via the network from a requesting computer system; and
 transmitting the expanded blockchain structure by way of the communication interface via the network to the requesting computer system in response to the received request.

17. The method according to claim 1, wherein the data to be stored includes status data of a device, the providing the data to be stored including receiving the data by way of a communication interface via a network from a computer system detecting the status data by way of a sensor, the method furthermore comprising:
 receiving a request for a current version of the blockchain structure by way of the communication interface via the network from a requesting computer system; and
 transmitting the expanded blockchain structure by way of the communication interface via the network to the requesting computer system in response to the received request.

18. The method according to claim 1, wherein the data to be stored includes data characterizing a processing operation of a digitally encoded document, the providing the blockchain structure including receiving the document to be processed, which includes the blockchain structure, and reading out the blockchain structure from the received document, the providing the data to be stored including processing the received document and generating the data, and the storage of the expanded blockchain structure including adding the expanded blockchain structure to the processed document and storing the processed document including the expanded blockchain structure.

19. The method according to claim 18, wherein the method furthermore comprises:
 receiving a request for the processed document by way of a communication interface via a network from a requesting computer system; and
 transmitting the processed document including the expanded blockchain structure by way of the communication interface via the network to the requesting computer system in response to the received request.

20. An electronic data storage system for storing data in a tamper-proof manner in a bidirectionally linked blockchain structure, wherein the data storage system comprises a processor and an electronic storage device including machine-readable instructions, an execution of the machine-readable instructions by the processor prompting the data storage system to carry out a method, comprising:

providing the bidirectionally linked blockchain structure;
providing the data to be stored;
generating an additional block for expanding the blockchain structure, which includes the data to be stored and is intended to be linked bidirectionally to a last block of the blockchain structure, the last block of the blockchain structure including stored data;
calculating a block-dependent linking function for bidirectionally linking the last block to the additional block, the calculation of the linking function comprising:
  calculating a combined block-dependent check value of the last block and of the additional block, using the data stored in the last block and the data to be stored in the additional block;
  associating the combined check value with a block-independent, linking process-specific function;
adding the block-dependent linking function to the last block;
adding the block-dependent linking function to the additional block; and
storing the blockchain structure expanded by the additional block.

21. A telecommunications system, comprising an electronic data storage system according to claim 20 and a communication interface for communicating via a network, the electronic data storage system including an electronic storage device, wherein the providing the data to be stored includes receiving the data by way of a communication interface via a network, the carried-out method furthermore comprising:
  receiving a request for a current version of the blockchain structure by way of the communication interface via the network from a requesting telecommunications system; and
  transmitting the expanded blockchain structure by way of the communication interface via the network to the requesting telecommunications system in response to the received request.

22. A telecommunications system, comprising an electronic data storage system according to claim 20 and a communication interface for communicating via a network, the electronic data storage system including an electronic storage device, wherein the data to be stored includes data characterizing a processing operation of a digitally encoded document, the providing the blockchain structure including receiving the document to be processed, which includes the blockchain structure, and reading out the blockchain structure from the received document, the providing the data to be stored including processing the received document and generating the data, and the storage of the expanded blockchain structure including adding the expanded blockchain structure to the processed document and storing the processed document including the expanded blockchain structure, the carried-out method furthermore comprising:
  receiving a request for the processed document by way of the communication interface via the network from a requesting telecommunications system; and
  transmitting the processed document including the expanded blockchain structure by way of the communication interface via the network to the requesting telecommunications system in response to the received request.

* * * * *